United States Patent
Diallo et al.

(10) Patent No.: US 10,375,169 B1
(45) Date of Patent: Aug. 6, 2019

(54) SYSTEM AND METHOD FOR AUTOMATICALLY TRIGGERING THE LIVE MIGRATION OF CLOUD SERVICES AND AUTOMATICALLY PERFORMING THE TRIGGERED MIGRATION

(71) Applicant: THE UNITED STATES OF AMERICA AS REPRESENTED BY THE SECRETARY OF THE NAVY, San Diego, CA (US)

(72) Inventors: Mamadou H. Diallo, Santee, CA (US); Michael A. August, San Diego, CA (US); Megan E. Kline, Chula Vista, CA (US); Scott M. Slayback, San Diego, CA (US); Roger A. Hallman, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 220 days.

(21) Appl. No.: 15/604,552

(22) Filed: May 24, 2017

(51) Int. Cl.
| | | |
|---|---|---|
| *H04L 29/08* | (2006.01) | |
| *H04L 29/06* | (2006.01) | |
| *G06F 11/34* | (2006.01) | |
| *G06F 11/14* | (2006.01) | |

(52) U.S. Cl.
CPC ...... *H04L 67/1097* (2013.01); *G06F 11/1484* (2013.01); *G06F 11/3409* (2013.01); *H04L 63/1425* (2013.01); *H04L 67/42* (2013.01)

(58) Field of Classification Search
CPC ............ H04L 63/1425; G06F 11/1484; G06F 11/3409
See application file for complete search history.

(56) References Cited

U.S. PATENT DOCUMENTS

| | | | | |
|---|---|---|---|---|
| 9,183,034 | B2* | 11/2015 | Shu ..................... | G06F 9/45558 |
| 9,720,728 | B2* | 8/2017 | Yu ......................... | G06F 9/4856 |
| 10,129,118 | B1* | 11/2018 | Ghare ................. | H04L 63/1425 |
| 2011/0320882 | A1* | 12/2011 | Beaty ........................ | G06F 8/63 |
| | | | | 714/45 |
| 2012/0096459 | A1* | 4/2012 | Miyazaki ............ | G06F 9/45558 |
| | | | | 718/1 |
| 2013/0227335 | A1* | 8/2013 | Dake ................... | G06F 11/0709 |
| | | | | 714/4.2 |
| 2013/0262390 | A1* | 10/2013 | Kumarasamy ...... | H04L 41/0846 |
| | | | | 707/649 |

(Continued)

*Primary Examiner* — Lashonda T Jacobs
(74) *Attorney, Agent, or Firm* — Naval Information Welfare Center, Pacific; Kyle Eppele

(57) ABSTRACT

A system and method maximize the availability of cloud services in the event of a disruption to one or more cloud servers by automatically triggering the live migration of selected cloud services and automatically performing the triggered migration of such services. The operational state of virtual machines operating on a cloud server and the services that are associated with the virtual machines is monitored. Different techniques are used for deciding when to migrate cloud services based on the automatic detection of anomalies, for deciding what cloud services to migrate so as to maximize the availability of high priority services during migration under time and network bandwidth constraints, and for deciding where to migrate the selected cloud services based on a determination of the best location for migration.

20 Claims, 5 Drawing Sheets

(56) References Cited

U.S. PATENT DOCUMENTS

| | | | |
|---|---|---|---|
| 2014/0082202 A1* | 3/2014 | Zhao | G06F 9/45558 709/226 |
| 2014/0146055 A1* | 5/2014 | Bala | G06F 11/1402 345/501 |
| 2014/0280373 A1* | 9/2014 | Raitto | G06F 16/27 707/803 |
| 2015/0234617 A1* | 8/2015 | Li | G06F 3/0647 711/114 |
| 2015/0237129 A1* | 8/2015 | Baker | H04L 67/1095 709/219 |
| 2016/0036655 A1* | 2/2016 | Burton | H04L 41/5029 709/223 |
| 2016/0092813 A1* | 3/2016 | Baker | G06Q 10/06313 705/7.23 |
| 2016/0110213 A1* | 4/2016 | Chen | G06F 9/45558 726/1 |
| 2016/0170793 A1* | 6/2016 | Decusatis | G06F 9/45558 718/1 |
| 2016/0188221 A1* | 6/2016 | Janik | G06F 3/0611 711/103 |
| 2016/0191342 A1* | 6/2016 | Kannan | H04L 41/5025 709/226 |
| 2016/0212064 A1* | 7/2016 | Biswas | H04L 47/781 |
| 2016/0291997 A1* | 10/2016 | Bernal | G06F 9/45558 |
| 2016/0299773 A1* | 10/2016 | Dong | G06F 9/45558 |
| 2016/0342453 A1* | 11/2016 | Khan | G06F 11/079 |
| 2016/0350173 A1* | 12/2016 | Ahad | G06F 11/3495 |
| 2017/0078314 A1* | 3/2017 | Mohanty | H04L 63/1425 |
| 2017/0147816 A1* | 5/2017 | Schilling | G06F 21/56 |
| 2018/0365090 A1* | 12/2018 | Ben Simhon | G06F 11/076 |

\* cited by examiner

| Variable | Description |
|---|---|
| S | Set of All Cloud Services |
| $S_i$ | A particular Cloud Service |
| S* | Set of Selected Cloud Services |
| $S^+$ | Set of Cloud Services Ordered by BCR |
| V | Set of All VMs |
| $V_j$ | A particular VM |
| V* | Set of Selected VMs |
| V' | Set of Candidate VMs |
| $C(V_j)$ | Cost of Individual VM, Defined by Memory Footprint of the VM |
| $P(S_i)$ | Priority Level of a Single Cloud Service (1 - 10) |
| P(S*) | Priority Value of Selected Cloud Services |
| $C(S_i)$ | Cost of Individual Cloud Service |
| C(S*) | Cost of Selected Cloud Services |
| M | Total Memory Budget |
| $BCR(S_i)$ | Benefit Cost Ratio of a Given Cloud Service |
| $F(V_j)$ | Frequency of a Particular VM |
| $C_F(S_i)$ | Frequency Adjusted Cost of a Particular Cloud Service |

FIG. 3

```
ImprovedGreedy (S, V, M)
{
        S_remain = S              /*Set of remaining services*/
        S* = ∅                    /*Selected services*/
        V* = ∅                    /*Selected VMs*/
        C_previous = -1           /*Previous costs*/
        C_current = 0             /*Current costs*/
        while (S_remain ≠ ∅ & C_current ≠ C_previous)
                C_previous = C_current
                calculateBCR(S_remain)
                S⁺ = sortServicesByBCR(S_remain)
                size = getNumberOfServices(S⁺)
                for (i=1 to size) (S_i⁺ ∈ S⁺)
                        C(S⁺_i) = CalculateCost(S⁺_i )
                        if (C_current + C(S_i⁺) ≤ M)
                                C_current = C_current + C(S_i⁺)
                                S* = S* ∪ {S_i⁺}
                                V' =GetListVMs(S_i⁺)
                                S_remain = S⁺ \ {S_i⁺}
                                insertSelectedVMs(V*, V', S_remain)
                                BREAK
                        end if
                end for
        end while
        Return S*
}
```

FIG. 4

CalculateCost(Si)
{
    $C_{total}(S_i) = 0$                            /*Initializes the cost of Si*/
    $V' = getListVMs(S_i)$             /*Get the list of VMs in Si*/
    for each ($V'_j \in V'$)
        $C_{total}(S_i) = C_{total}(S_i) + C(V'_j)$
    end for each
    Return $C_{total}(S_i)$
}

InsertSelectedVMs ($V^*$, $V'$, $S_{remain}$)
{
    for each ($V'_j \in V'$)
        $V^* = V^* \cup V'_j$          /*Add VM to selected VMs*/
        for each ($S_i \in S_{remain}$)
        $V = getListVMs(S_i)$    /*Get list of VMs*/
        for each ($V_j \in V$)
            if ($V_j = V'_j$)
                $C(V_j) = 0$ /*Set cost VM to zero*/
            end if
        end for each
        end for each
    end for each
    Return $V^*$
}

FIG. 4 (Cont.)

SYSTEM AND METHOD FOR AUTOMATICALLY TRIGGERING THE LIVE MIGRATION OF CLOUD SERVICES AND AUTOMATICALLY PERFORMING THE TRIGGERED MIGRATION

FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif. 92152; telephone (619) 553-5118; email: ssc_pac_t2@navy.mil. Reference Navy Case No. 104,117.

BACKGROUND OF THE INVENTION

Cloud services are well known as on-demand services provided to end-users over the Internet and hosted by cloud service providers. Cloud services are typically deployed as sets of applications/processes running on one or more Virtual Machines ("VMs"). Such VMs serve as emulations of a particular computer system which run on the hardware of a cloud service provider's data center.

Many organizations are increasingly embracing cloud services for outsourcing their Information Technology departments, enhancing flexibility, and improving efficiency. But because such cloud services are typically hosted by third party cloud service providers and accessed over the Internet, an organization's ability to access and use cloud services may be affected by conditions outside of the organization's control, such as anomalous circumstances (e.g., natural disasters, power failure, cybersecurity attacks, etc.) that may spontaneously disrupt availability of the cloud service provider's servers or network connectivity.

But because virtualization is at the core of cloud infrastructure, portability of server operating environments is inherently enabled. Indeed, as VMs are not bound to particular hardware, they may be migrated from one server to another. While current implementations of live migration have focused on the migration of single or multiple VMs, what has not been addressed is the migration of complete services, which requires the migration of a cluster of VMs as they continue to operate together to avail cloud services. Such migration may allow for complete services (as opposed to just a VM that provides a portion of a service) to remain available to an organization even if access to, or the availability of, a cloud service provider's initial host server is compromised.

Generally, VM migration may be either a live migration, which keeps the VMs running and their services in operation during migration, or a non-live migration, which temporarily shuts down the VMs for migration from an initial host server and restarts them once their memory state has reached a destination server. Live migration of VMs has been used in various tasks, including IT maintenance (e.g., by transparently migrating VMs off of a host which will be brought down for maintenance), load balancing (e.g., by migrating VMs off of a congested host to a machine with a lower CPU or I/O load), power management, (e.g., by migrating VMs from multiple servers onto fewer servers in order to reduce data center power consumption), and development-to-operations support (e.g., by migrating VMs residing in the development environment over to the test environment, and then to the operational environment).

As such, it is contemplated that live migration may be used as a mechanism for improving resilience/availability of cloud services. Assuming a cloud infrastructure as a service (IaaS) model where cloud service providers manage virtual machine instances and offer them as a service to customers, it follows that when there is an anomaly in a cloud infrastructure that can result in disruption of the cloud (i.e., the cloud servers are no longer functional), VMs will need to be migrated to preserve the availability of the services they are providing.

A problem which still exists is that migrating a large number of VMs can take a long time, which users may not have in the event wherein the cloud is under disruption. For instance, to migrate a 2 GB VM from source to destination host in the same subnet with reasonable bandwidth can take tens of seconds. To address this problem, VMs need to be filtered for migration based on how valuable they are to their owner. As a result, the priorities of cloud services should be used in determining which ones should be migrated so as to maximize the availability of the highest priority services.

Accordingly, a need remains for a system and method which can manage live migrations of VMs to maximize the availability of high priority cloud services when the cloud is under disruption. Notably, when a set of VMs are sought to be migrated from one host to another due to a disruption that may cause a potential service interruption, it is important to realize that the interruption will place a limit on the time available for the migration to process. Thus, it is contemplated that in order to adequately address this need, such a system and method will need to manage the live migration by automatically identifying which set of VMs to migrate, where to migrate them, and under what conditions the migration should happen.

SUMMARY

A system and method are provided that maximize the availability of cloud services in the event of a disruption to one or more cloud servers by automatically triggering the live migration of selected cloud services and optimizing the triggered migration of such services. The automatic live migration system and method provide a framework for developing intelligent systems that can monitor and migrate cloud services to maximize their availability in case of cloud disruption. The overall objective of this framework is to identify when cloud services need to be migrated, what cloud services should be migrated, and where these services should be migrated to. This framework takes into account time, memory, and bandwidth constraints in its decision making process. At the heart of the framework is a monitor, which keeps track of each VM's state and resource usage over time.

The framework facilitates the incorporation of algorithms for automatically detecting anomalies to trigger live migration of cloud services. In one embodiment, a machine learning algorithm is implemented to detect anomalies in VM resource usage (CPU, memory, disk, and network usage). Once the decision to migrate is reached, the framework includes a cloud service selection algorithm for selecting a subset of cloud services to migrate that maximizes the availability of high priority cloud services under time and network bandwidth constraints. Once the subset of VMs is selected, the monitor provides information that can be used to determine the best location for migration. In one embodiment, an algorithm is implemented for determining the best location for migration based on the information provided by the monitor and the selected CSs. Once the destination host is determined, the live migration is triggered.

BRIEF DESCRIPTION OF THE DRAWINGS

FIG. 3 shows a table of variables used by the CS selection process of an automatic live migration system in accordance with the disclosed embodiments.

FIG. 4 shows a greedy selection algorithm, ImprovedGreedy, that may be used with the CS selection process of an automatic live migration system in accordance with the disclosed embodiments.

DETAILED DESCRIPTION OF SOME EMBODIMENTS

Figure 1:
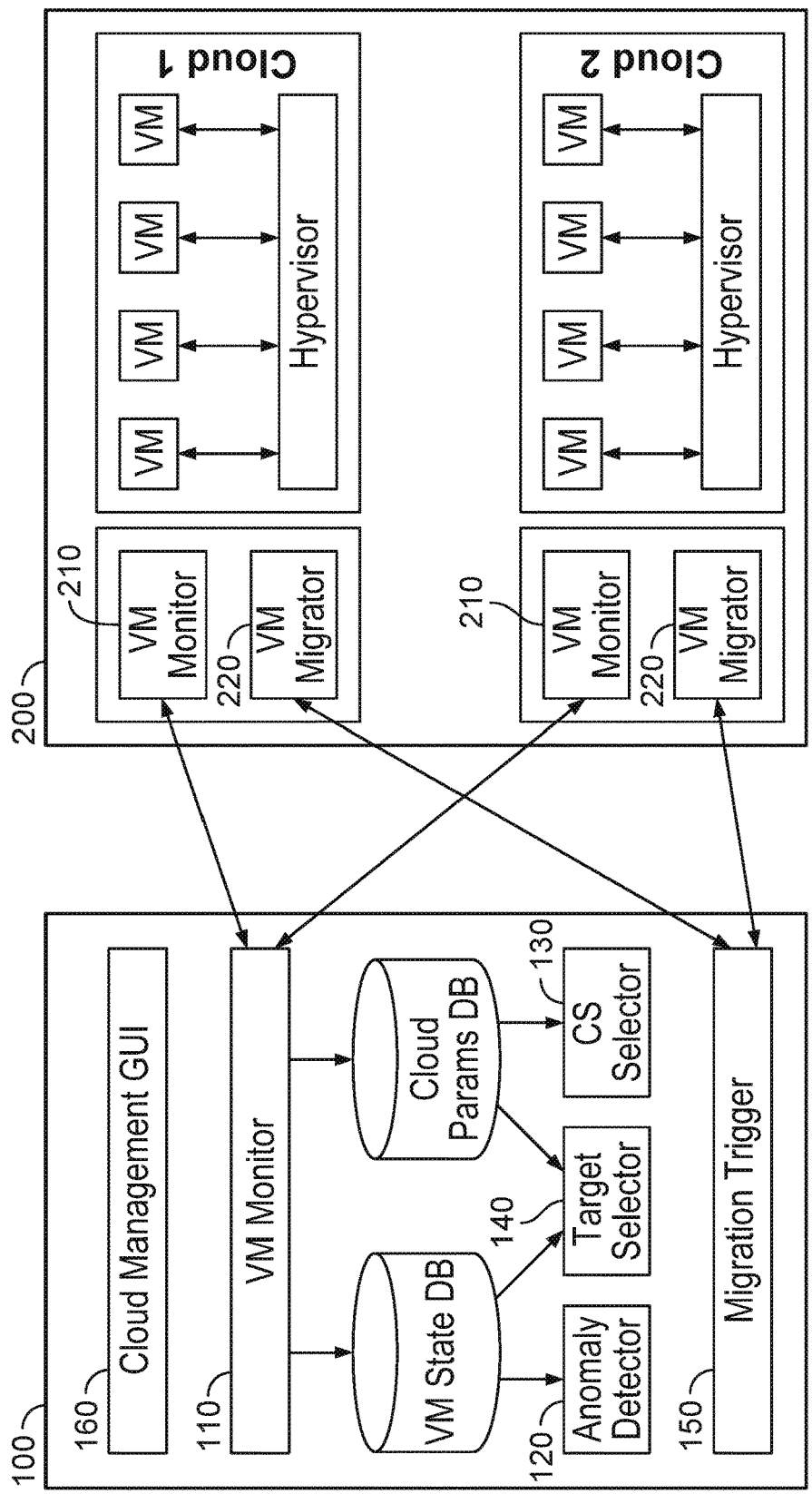
FIG. 1 shows a block diagram of an embodiment of the architecture of an automatic live migration system in accordance with the disclosed embodiments.

The embodiments disclosed herein relate generally to the management of cloud services through live migrations so as to maximize their availability in the event of a disruption to one or more cloud servers. Referring now to FIG. 1, a system and method, which maximize the availability of cloud services in the event of a disruption to one or more cloud servers by automatically triggering the live migration of selected cloud services and optimizing the triggered migration of such services, are described herein. The automatic live migration system and method use a client/server architecture. The client 100 can be deployed in the cloud or on a local machine. The server 200 is typically deployed in the cloud, co-located with the VMs under observation. The client-side components are: the VM Monitor 110, Anomaly Detector 120, CS Selector 130, Target Selector 140, and the Migration Trigger 150.

Each of these components is dynamic, continually running in the background to determine which VMs should be migrated at any given time to maximize the availability of the services they are providing, to determine when to actually trigger the migration process, and to determine suitable destinations for the services being migrated. The combination of these components creates an autonomic system which is aware of the state of the VMs, the importance of services hosted on VMs, and the dependencies between services and VMs. Note that a cloud service can consist of multiple applications/processes running on one or more VMs. This autonomic system can then adapt to changes in the environment automatically with minimal user intervention.

The VM Monitor 110 is used to keep track of the behavior of each VM in the cloud. It communicates with the server-side VM Monitor 210 to collect and store data about each VM running in the cloud. This includes checking the status of the VMs (on or off), and the status of cloud services (running or stopped). If a VM is on, it can also determine the CPU, memory, disk, and network utilization. The VM Monitor 110 also facilitates the visualization of the collected data through the web-based Cloud Management GUI 160. Through the GUI 160, a user can provide input about external events, such as natural disasters that could lead to the disruption of cloud services.

In one embodiment, the VM Monitor 110 makes use of an agent running in the hypervisor. The hypervisor collects the metrics on the behalf of the VM Monitor 110 and reports them to the VM Monitor 110. Since a hypervisor can collect metrics on each of its underlying VMs, only one agent needs to be deployed on each hypervisor in the cloud, making this approach more lightweight than other deployment models.

In other embodiments, the VM Monitor 110 may make use of an agent running on each VM in the cloud. The agent interacts directly with the OS to collect the metrics and reports them to the VM Monitor. This approach requires an agent to be deployed on each VM running in the cloud, which requires increased communication and coordination amongst the VMs.

The Anomaly Detector 120 is responsible for detecting anomalies, automatically or manually through user inputs, when a cloud is facing disruption. An anomaly can affect a single VM, a single hypervisor, or an entire data center. In one embodiment, the Anomaly Detector 120 can automatically detect anomalies based on the VM state data (or "VM metrics") presented to it by the VM Monitor 110. It tries to predict what the future state of each VM will be. The Anomaly Detector 120 can also incorporate other techniques for detecting anomalies. For instance, advanced intrusion detection and prevention systems (IDPS) can be used to detect attacks based on log analysis, attacks which can lead to anomalies. Anomalies can also be manually provided to the framework by users.

It is contemplated that the Anomaly Detector 120 may use Machine Learning techniques to detect anomalous behavior on the VMs running in the cloud based on the VM metrics. Three of such machine learning based techniques are described below in order to exemplify the type of techniques which can be employed in accordance with the present invention.

First, a k-means clustering algorithm (KMeans) clusters data into a number of distinct groups using a distance measure. Using this algorithm, we first learn the normal behavior of each VM using the metrics collected from the VM. Then, using this historical data for each VM, data clusters are formed. As new data for the VM is collected, we can identify whether or not the VM is exhibiting anomalous behavior by comparing the current data to the historical data clusters. In the Anomaly Detector 120, we use the k-means clustering to separate out the VM data into two groups—normal behavior and anomalous behavior. There are many different libraries that implement this algorithm, making it easy to incorporate into the instant invention. However, since the instant invention can run many different types of services and different sizes of VMs, there may not be an easy way to get a good training set to train an algorithm to lead to accurate predictions.

Second, the Twitter Anomaly Detection library, employing an underlying algorithm called seasonal hybrid ESD (extreme Studentized deviate), may be employed by the Anomaly Detector 120. This library takes the underlying ESD algorithm and adapts it to detect anomalies on seasonal data. Twitter® used this library to detect anomalies in number of tweets per day. The library was written such that it analyzes whole sets of data at once. To use this library, we would need to break up the data into discrete time chunks and run the algorithm over it. As a system that should be monitoring the VMs constantly this may not be ideal since we would need to wait for enough data to process it. However, since the library is open source we could modify the library to work using incremental data entry.

Third, a Kalman Filter method may be employed by the Anomaly Detector 120. This method has been shown to take the data point needed (CPU, memory, etc.) and find anomalies in a time series of that data. The algorithm is iterative meaning that it processes the data points one at a time, not requiring entire sets of data. This algorithm converges to the correct answer so the algorithm learns from the VM and will provide accurate anomalies over time. There are a number of libraries that implement anomaly detection using the Kalman Filtering. In one implementation, an implementation of the Kalman Filter, Kalman Smoother, and expectation-maximization (EM) algorithm has been employed in the Anomaly Detector 120

The Cloud Service (CS) Selector 130 automatically selects candidate VMs for migration based on the priority of the services hosted across those VMs. The manner in which this may be performed is addressed below in the description of the CS selection process.

Based on a comparison of the resource capacity of the available destination hosts, the Target Selector 140 automatically determines an appropriate destination host for the migration of each selected VM. At the minimum, deciding where to migrate a set of selected cloud services requires taking into account the load of the cloud services in the source host as well as the availability of resources in the destination host. Ideally, the destination host needs to have enough memory to efficiently run the VMs hosting the cloud services, without compromising the availability of the cloud services. In addition, the availability of resources should be relatively stable. Otherwise, the probability of migrating the cloud services again in the near future may be high, which can lead to the degradation of availability due to frequent migration.

One technique employed by the instant system and method for deciding where to migrate cloud services is to assess the resources of the available destination hosts after deciding what cloud services to migrate, and select the one that has the highest available resources. If all the destination hosts are less susceptible to anomalies and have constant resource usage, then this technique can result in a good performance. Migrating cloud services would be less frequent.

In order to provide an improved approach, techniques need to take into account the overall behavior of the destination hosts over time. Automated techniques based on machine learning, which learn and predict the behavior of cloud hosts in the future will be necessary to guarantee maximum performance and availability of cloud services. As with anomaly detection, a number of such techniques which may be employed in the instant invention are discussed below.

A first technique is the Autonomic Management System (AMS). The AMS makes use of multiple managers to dynamically evaluate each system under management by collecting metrics such as workload, and memory usage. The AMS technique can be extended so that, in addition to getting global view of all the VMs in a given host, it can keep track of the historical view of the states of the VMs. In this case, a technique based on machine learning can be used to accurately predict the resource availability of the hosts for an extended period of time in the future. The prediction will be significant in making a better decision when choosing a destination host for migration. For instance, if snapshots of the states of all hosts are taken, one host may appear to have the highest resource available. But, when considering a period of time, the host might have the lowest available resource on average.

A second technique is the VM placement in a cloud infrastructure (See, e.g., Masdari, M., Nabavi, S. S., Ahmadi, V.: An overview of virtual machine placement schemes in cloud computing.). The VM placement techniques seeks the best physical machines that can host VMs to achieve desired factors affecting the data centers such as performance, resource utilization, and power consumption. In the instant invention, the goal of the Target Selector 140 is to maximize the cloud services availability after placing the VMs in the destination host. The proposed VM placement techniques are mainly based on the concepts of "First Fit," "Next Fit," "Random Fit," "Least full first," and "Most Full First." There are different VM placement schemes based on these concepts such as integer programming-based, constraint programming-based, and graph theory-based VM placement. These schemes can be classified as traffic-aware, energy-aware, cost-aware, resource-aware, and cost-aware [28]. The resource-aware schemes are more tailored to achieve the goal of the Target Selector 140.

The Migration Trigger 150 takes the list of VMs to be migrated and the selected destination host and initiates the migration process for those VMs. It also provides a mechanism for users to manually initiate a migration in response to potential disruption of cloud services (e.g., a natural disaster impacting the cloud).

The server-side components are: the VM Monitor 210 and the VM Migrator 220. The VM Monitor 210 continuously monitors the state of each VM and the overall state of the cloud services. The client-side VM Monitor 110 continuously pulls the data from the server-side VM Monitor 210, which is used by the Anomaly Detector 120 to analyze the data. The VM Migrator 220 initiates migration of the specified VMs based on input from the client-side Migration Trigger 150. It also keeps track of the state of the migration process. If a VM fails to migrate, it can attempt to reinitiate the migration.

The components of the automatic live migration system and method interact to autonomously perform live migration of VMs to preserve cloud service availability. This preservation may require live migration of multiple, interacting VMs. Migration operations are performed on individual VMs as supported by the underlying hypervisor. This means that a cloud service will not be fully available until after the last supporting VM has completed migration. If one of the VMs supporting a cloud service fails to migrate, then the cloud service will not be fully available on the destination host. Applications are individual programs that run on VMs and each cloud service is composed of one or more applications.

It is contemplated that the VMs are globally addressable and can be accessed via the Internet, which minimizes downtime. The client has an interface which a user can use to perform VM management tasks, including system initialization, configuration, and manual triggering of VM migration. From this user interface, the user can define the priority level of each cloud service as well as the mapping of cloud services across VMs.

The user can also provide a list of available clouds and the preferred destination host for migration of VMs. For simplification, it is assumed that only one client is allowed to manage a set of VMs at a time.

Figure 2:
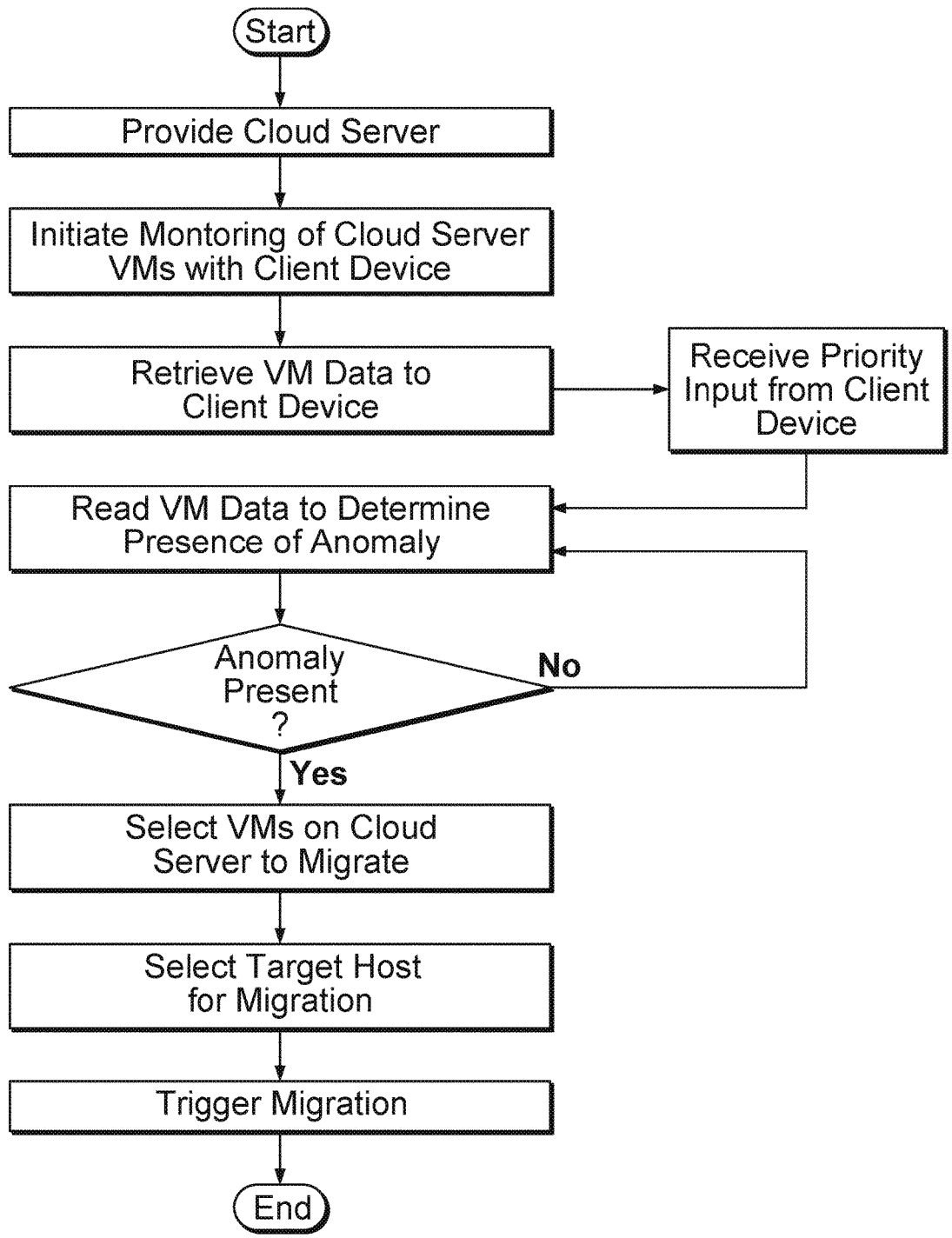
FIG. 2 shows a flowchart illustrating the steps of an embodiment of an automatic live migration method in accordance with the disclosed embodiments.

Referring now to FIG. 2, the operational workflow of the automatic live migration system and method begins with a user logging into the cloud management interface and starting up the automatic live migration service, which includes the server-side VM Monitor and VM Migrator. Then the client-side VM Monitor connects to the server-side VM Monitor and initiates a request to pull VM state data. Once this data is pulled, the client-side VM Monitor stores the data in the VM State DB and makes it available to the user interface.

Periodically, the Anomaly Detector reads the VM State DB and performs behavioral analysis to detect the presence of anomalies. In the event an anomaly is detected, the Anomaly Detector sends a signal to the Migration Trigger to initiate the migration process. The CS Selector takes as input the cloud parameters (set of VMs, set of cloud services, and the dependencies between them) from the Cloud Params DB and runs the CS selection process to determine which CSs to migrate, as discussed in greater detail below. A list of selected VMs to migrate is passed to the Migration Trigger. The Target Selector takes as input the VM state and cloud parameters and determines the ideal destination host for the migrated VMs, which is passed to the Migration Trigger. The Migration Trigger sends migration commands to the server-side VM Migrator. The list of VMs to be migrated and the destination host are sent along with the command.

During the migration process, the Anomaly Detector must disable itself in order to prevent any race conditions that could result from initiating redundant migrations of VMs. Once migration is complete, Anomaly Detector resumes normal operations.

As discussed above, the automatic live migration in accordance with the present invention is triggered when an anomaly-based mechanism, which is employed through the Anomaly Detector in the illustrated embodiment, identifies a likely failure of the host machine in the immediate future. In such a scenario, it is contemplated that the exact time to failure is likely unknown, and it is possible that it will occur before all of the CSs can be migrated. Therefore, automatic live migration in accordance with the present invention must utilize a CS selection mechanism to go through a CS selection process that prioritizes the CSs for migration.

It is contemplated that in operation, the presence and type of the anomalies detected will place a limit on the time available for the migration process. The exact time-to failure may generally be unknown, but it is possible that it will occur before all of the machines can be migrated. In fact, the migration of a single VM may take tens to hundreds of seconds on a network with reasonable bandwidth. With a set of cloud services that uses a large number of VMs, the migration process may take a long time, which might not be feasible under time and bandwidth constraints. For instance, systems that depend on satellite communications have very low bandwidth compared to systems using land-based networks.

To account for this concern at runtime, a pre-defined time bound that a user provides is used for the migration process. This time limit can be translated into a threshold on migratable memory, or memory budget, which is the total amount of memory that can be migrated within the time limit, using the known bandwidth of the environment.

Notably, as end users of cloud systems interact with services, as opposed to the underlying VMs, the goal of the CS selection process is to select a set of CSs that maximizes the number of services that remain available to the end user. The problem of prioritizing CSs for migration may be further complicated because the end user or cloud administrator are allowed to determine the importance of individual cloud services.

In one embodiment, the CS Selector component within the automatic live migration system and method is responsible for selecting a set of cloud services for migration according to the memory budget. As such, the CS selector provides the CS selection mechanism to perform the CS selection process that selects which CSs to migrate at the time migration is triggered based on which cloud services have been prioritized.

The CS selection process is performed through a greedy selection algorithm. In this algorithm, the problem of prioritizing the migration of CSs is treated as a case of the Set-Union Knapsack Problem in the following manner. A collection of sets with associated costs is defined over a domain of elements with associated priorities. The goal is to find the collection of selected sets wherein the sum of the costs for selected sets does not exceed a given budget, and the total priority of elements covered by the selected sets is maximized.

Referring now to FIGS. 3 and 4, the CS selection process is shown as a direct application of the Set-Union Knapsack Problem (SUKP) and is defined as follows. Consider a set of Cloud Services $S=\{S_1, S_2, \ldots, S_n\}$ with priority $P(S_i)$: $S \rightarrow Z+$ for each cloud service $S_i$ and a set of Virtual Machines $V=\{V_1, V_2, \ldots, V_m\}$ with nonnegative cost $C(V_j)$: $V \rightarrow Z+$ for each virtual machine V. The cost of each $V_j$ is the total memory used by the virtual machine. The Memory Budget, M, is the estimated amount of memory that can be migrated before cloud disruption occurs. The goal is to find a subset of the cloud services $S^* \subseteq S$, for Memory Budget, M, such that the priority of $S^*$, $P(S^*)$, is maximized and the cost of $S^*$, $C(S^*)$, is bounded by M. In other words, maximize $\Sigma_{S_i \in S} P(S_i) \cdot y_i$, subject to $\Sigma C(V_j) \cdot x_j \leq M$ $y_i \in \{0,1\}$, where $y_i=1$ indicates an available service $x_j \in \{0,1\}$, where $x_j=1$ indicates a migrated VM. This is done with the understanding that the Memory Budget represents the memory that can be transmitted over a network from the initial host to the target host in the time available.

As illustrated in FIG. 4, the solution is based on the greedy algorithm defined in the Set-Union Knapsack Problem. The greedy algorithm (ImprovedGreedy, in the illustrated embodiment) uses the benefit-to-cost ratio (BCR) of all cloud services as a heuristic to minimize the amount of computation. The BCR uses the frequency adjusted cost (FAC) in place of the actual cost. The FAC takes into account the cost of a VM that is shared by multiple cloud services. The FAC and BCR for a cloud service $S_i$ are calculated as follows:

$$C_F(S_i) = \sum_{V_j \in S_i} \frac{C(V_j)}{F(V_j)} \quad BCR(S_i) = \frac{P(S_i)}{C_F(S_i)},$$

The ImprovedGreedy algorithm takes as input a set of services mapped onto a set of VMs and the memory footprint of each VM. In addition, the BCR values are recalculated in each iteration after removing the selected service for migration in the algorithm.

In one embodiment, the priority value of a cloud service is an integer between 1 and 10, with 10 representing the highest priority cloud services.

It will be understood that many additional changes in the details, materials, steps and arrangement of parts, which have been herein described and illustrated to explain the nature of the invention, may be made by those skilled in the art within the principle and scope of the invention as expressed in the appended claims.

We claim:
1. A method comprising the steps of:
providing, by a cloud server system, a plurality of cloud services through processes running over a set of virtual machines hosted on the cloud server system;
monitoring, by a client computer system, at least one monitored virtual machine, wherein the at least one monitored virtual machine is among the set of virtual machines operating on the cloud server system and the step of monitoring includes at least retrieving, by the client computer system, status data related to an operation of the monitored virtual machine from the cloud server system;

detecting, by the client computer system, an anomaly indicative that the cloud server system is facing a disruption, wherein the step of detecting is performed using status data retrieved from the cloud server system; and in the event an anomaly is detected, selecting, by the client computer system, a set of selected cloud services to be migrated, wherein said set of selected cloud services is among the set of cloud services operating on the cloud server system and the step of selecting includes at least associating a priority value with each of a plurality of candidate cloud services in the set of cloud services and weighing a migration memory cost for each of a plurality of candidate virtual machines such that the priority value for the set of selected cloud services, collectively, is maximized while the migration memory cost for the set of selected virtual machines, collectively, does not exceed a given threshold.

2. The method of claim 1 further comprising the step of target selecting, by the client computer system, at least one destination host for the set of selected cloud services to be migrated to, wherein the step of target selecting is performed using status data retrieved from the cloud server system.

3. The method of claim 2 further comprising the step of triggering, by the client computer system, the migration of the set of selected cloud services, wherein the step of triggering includes transmitting data related to the set of selected cloud services and the destination host to the cloud server system and commanding the cloud server system to begin migrating the set of selected cloud services to the destination host.

4. The method of claim 1 further comprising the step of assigning, by the client computer system, a priority level for at least two of the plurality of cloud services.

5. The method of claim 4, wherein the priority level assigned for the at least two of the plurality of cloud services is received from an input on a user interface on the client computer system.

6. The method of claim 1, wherein the step of selecting employs a greedy selection algorithm defined in a Set-Union Knapsack Problem to select the set of selected cloud services to be migrated.

7. The method of claim 1, wherein said set of selected cloud services are run on a threatened set of virtual machines which is among the set of virtual machines operating on the cloud server system and said threatened set of virtual machines require physical migration to a discrete second cloud server system.

8. A method comprising the steps of:
providing, by a cloud server system, a plurality of cloud services through processes running over a set of virtual machines hosted on the cloud server system;

monitoring, by a client computer system, at least one monitored virtual machine, wherein the at least one monitored virtual machine is among the set of virtual machines operating on the cloud server system and the step of monitoring includes at least retrieving, by the client computer system, status data related to an operation of the monitored virtual machine from the cloud server system;

assigning, by the client computer system, a priority level for at least two of the plurality of cloud services;

detecting, by the client computer system, an anomaly indicative that the cloud server system is facing a disruption, wherein the step of detecting is performed using status data retrieved from the cloud server system;

in the event an anomaly is detected, selecting, by the client computer system, a set of selected cloud services to be migrated, wherein said set of selected cloud services is among the set of cloud services operating on the cloud server system and the step of selecting includes at least associating a priority value with each of a plurality of candidate cloud services in the set of cloud services and weighing a migration memory cost for each of a plurality of candidate virtual machines such that the priority value for the set of selected cloud services, collectively, is maximized while the migration memory cost for the set of selected virtual machines, collectively, does not exceed a given threshold; and target selecting, by the client computer system, a destination host for the set of selected cloud services to be migrated to, wherein the step of target selecting is performed using status data retrieved from the cloud server system.

9. The method of claim 8 further comprising the step of triggering, by the client computer system, the migration of the set of selected cloud services, wherein the step of triggering includes transmitting data related to the set of selected cloud services and the destination host to the cloud server system and commanding the cloud server system to begin migrating the set of selected cloud services to the destination host.

10. The method of claim 8, wherein the priority level assigned for the at least two of the plurality of cloud services is received from an input on a user interface on the client computer system.

11. A system comprising:
a cloud server to provide a plurality of cloud services through processes running over a set of virtual machines hosted on the cloud server such that each of the plurality of cloud services is associated with at least one of the virtual machines in the set of virtual machines;

a server virtual machine (VM) monitor integral with said cloud server to monitor each virtual machine in the set of virtual machines hosted on the cloud server system;

a client device communicatively coupled to said cloud server over a computer network;

a client virtual machine (VM) monitor integral with said client device to collect and store data relating to each virtual machine in the set of virtual machines hosted on the cloud server;

an anomaly detector integral with said client device to use data collected and stored by the client virtual machine (VM) monitor to determine when the cloud server is facing a disruption;

a cloud service selector integral with said client device to select a set of selected cloud services to be migrated by at least associating a priority value with each of a plurality of candidate cloud services in the set of cloud services and weighing a migration memory cost for each of a plurality of candidate virtual machines such that the priority value for across the set of selected cloud services, collectively, is maximized while the migration memory cost for the set of selected virtual machines, collectively, does not exceed a given threshold, wherein said set of selected virtual machines is among the set of virtual machines hosted on the cloud server.

12. The system of claim 11 further comprising a target selector integral with said client device to determine a destination host for the set of selected cloud services to be migrated to using status data retrieved from the cloud server system.

13. The system of claim 12 further comprising a migration trigger integral with said client device to trigger the migration of the set of selected cloud services by transmitting data related to the set of selected cloud services and the destination host to the cloud server and commanding the cloud server to begin migrating the set of selected cloud services to the destination host.

14. The system of claim 13 further comprising a VM migrator integral with said cloud server to initiate the migration of the set of selected cloud services to the destination host in response to a command from the migration trigger.

15. The system of claim 11, wherein the client VM monitor collect data relating to each virtual machine in the set of virtual machines hosted on the cloud server system by retrieving the data from the server VM monitor.

16. The system of claim 11, wherein the anomaly detector determine when the cloud server system is facing a disruption through user input.

17. The system of claim 11, wherein the client VM monitor provide a graphical user interface which visualizes collected data and enables the receipt of user input.

18. The system of claim 11, wherein the client VM monitor collect and store data relating to each virtual machine in the set of virtual machines hosted on the cloud server that includes the status of any of the virtual machines, the status of cloud services running on any of the virtual machines, and, if any of the virtual machines is on, the CPU, memory, disk and network utilization.

19. The system of claim 11, wherein the anomaly detector use data collected and stored by the client VM monitor and perform behavior analysis to detect anomalies so as to determine when the cloud server is facing disruption.

20. The system of claim 11, wherein the cloud service selector employs a greedy selection algorithm defined in a Set-Union Knapsack Problem to select the set of selected cloud services to be migrated.

* * * * *